United States Patent [19]

De Biévre et al.

[11] 4,414,005

[45] Nov. 8, 1983

[54] METHOD OF ENCAPSULATING MATERIALS IN A ZEOLITE IN A STABLE MANNER

[75] Inventors: Paul J. De Biévre, Kasterlee; Etienne F. Vansant, Zoersel; Guido J. Peeters, Berchem, all of Belgium

[73] Assignee: European Atomic Energy Community (Euratom), Luxembourg, Luxembourg

[21] Appl. No.: 309,222

[22] Filed: Oct. 6, 1981

[30] Foreign Application Priority Data

Oct. 13, 1980 [NL] Netherlands ................. 8005645

[51] Int. Cl.³ .............................. B01D 53/04
[52] U.S. Cl. ................................ 55/75; 427/226; 428/405; 502/62; 502/63
[58] Field of Search .......... 55/66, 75; 206/0.6, 206/0.7; 252/455 Z; 427/220, 226; 428/405

[56] References Cited

U.S. PATENT DOCUMENTS

| | | | |
|---|---|---|---|
| 3,305,656 | 2/1967 | Devins | 55/75 X |
| 3,316,691 | 5/1967 | Sesny et al. | 55/75 X |
| 3,442,819 | 5/1969 | Herbert | 55/75 X |
| 3,536,521 | 10/1970 | McKinney et al. | 55/75 X |
| 3,658,696 | 4/1972 | Shively et al. | 55/75 X |
| 3,698,157 | 10/1972 | Allen et al. | 55/75 X |
| 3,962,129 | 6/1976 | Munzner et al. | 55/75 X |
| 3,993,443 | 11/1976 | Guenthner | 428/405 X |
| 4,059,544 | 11/1977 | Yamaguchi et al. | 427/226 X |
| 4,072,796 | 2/1978 | Reinhardt et al. | 428/405 |
| 4,090,981 | 5/1978 | Rodewald | 55/75 X |
| 4,143,182 | 3/1979 | Henney et al. | 427/226 |
| 4,158,639 | 6/1979 | Berty | 206/0.7 X |
| 4,223,070 | 9/1980 | Hahn et al. | 427/220 X |

FOREIGN PATENT DOCUMENTS

| | | |
|---|---|---|
| 29875 | 4/1980 | European Pat. Off. . |
| 1551246 | 11/1968 | France . |
| 2215576 | 1/1973 | France . |
| 2311390 | 5/1976 | France . |

OTHER PUBLICATIONS

McAteer & Rooney, "Modification of Hy Zeolite by Reaction With Tetramethylsilane", Molecular Sieves, 1973, pp., 258–265.

Journal Of The Chemical Society, R. M. Barrer et al., "Modified Zeolites," 1978, pp. 2786 to 2806.

*Primary Examiner*—Robert H. Spitzer
*Attorney, Agent, or Firm*—Stevens, Davis, Miller & Mosher

[57] ABSTRACT

The present invention relates to compounds, elements or ions encapsulated in a zeolite in a stable manner by adsorption, chemisorption or ion exchange, by using a zeolite treated before, together with, or after the introduction of the material to be enclosed with a modifying agent selected from the group consisting of silanes, boranes and germanes, which may be substituted by one or more halogen atoms and/or hydrocarbon groups, and after the introduction closing the pores by a further treatment with the modifying agent and/or by an oxidation treatment.

4 Claims, No Drawings

METHOD OF ENCAPSULATING MATERIALS IN A ZEOLITE IN A STABLE MANNER

This invention relates to a method of encapsulating compounds, elements or ions in a zeolite or molecular sieve by adsorption, chemisorption or ion exchange, in particular gases, such as poisonous residues, isotopes, radioactive waste and other gases.

It is also possible to encapsulate such substances, starting from a solution thereof in a solvent which itself cannot be included in the zeolite.

Furthermore, ions from an aqueous solution can be included in a zeolite by ion exchange and encapsulated therein.

It is known that solids, such as zeolites, can adsorb gases and other materials and that they can also take in ions by ion exchange. One condition is always that the size of the molecules or ions must be small enough to allow the molecules or ions to penetrate into the zeolite passages. In addition to physical adsorption, chemisorption occurs in many instances, in which the adsorbed material enters into a chemical reaction with the zeolite, for example, with the OH groups present therein.

Such a physical adsorption or chemisorption or ion exchange however, is always a reversible process, so that an adsorbed gas is slowly or rapidly released spontaneously upon contact with atmospheric air, and bound ions can be liberated upon contact with aqueous solutions.

For the above reason such a simple adsorption, chemisorption or ion exchange is unsuitable for fixing undesirable materials definitely and in a stable manner, or for storing desirable substances in a simple and effective manner.

In U.S. Pat. No. 3,316,691, it is proposed to encapsulate gases or liquids in a suitable zeolite, whose pores are large enough to take in the molecules concerned. In that process the gas or liquid, e.g. argon, krypton or methane, is adsorbed in the zeolite at a high pressure, e.g. 2000 ats, and at a high temperature, e.g. 250°–350° C. After completion of the adsorption, the whole is cooled to roomtemperature and the pressure is released. It turns out that thereafter the adsorbed gas is only very slowly released again at roomtemperature. Desorption proceeds at a higher rate at a high temperature, for example, the temperature used during the adsorption. Repressure must then be maintained at a lower value than the adsorptionpressure. According to the patent, this slow desorption is due to a potential barrier at the entrance of the pores. It is more probable, however, that the adsorbed molecules can only escape from the pores by diffusion, which always proceeds at a slow rate, but going on continuously until all of the gas has been desorbed. Although it is proposed in the patent to use this method for storing adsorbed gases for a longer or shorter period of time. it is accordingly clear that this is only practicable, if the regular escape of a portion of such gases is not objectionable.

French Pat. No. 73 030 60 describes a method of using methane gas as a fuel for, for example, a motorcar engine. In it, the methane is stored under pressure in a zeolite, and released thereby as required when the pressure is reduced. The consequence is that storage requires a lower pressure than without the zeolite.

In storing radioactive gases, rare or expensive gas, or for the storage of gases enriched in certain isotopes, the continuous escape of gas is unacceptable, and hence other methods must be used.

It is possible to store gases by compressing them in cylinders, and storing the cylinders. This, however, is only effective if the amount of gas is not too large and not too small.

It is also possible to liquefy the gas and to store it in the liquid state. That method, too, is not efficient for small amounts of gas, for example, a few grams, and even in the case of large amounts of gas, there is always a problem that a cooling installation must continuously be kept on stand-by to maintain the low temperature.

For very small amounts of gas, the ion implantation method has been developed, in which ions of the gas concerned are given a high velocity in an accelerator, whereafter the ions are called to penetrate into a substrate, in which they remain fixed. That method requires highly expensive apparatus and excessive power consumption, and is only suitable for very small quantities.

According to the present invention, compounds, elements or ions are encapsulated in a zeolite in a stable manner by adsorption, chemisorption or ion exchange, by using a zeolite treated before, together with, or after the introduction of the material to be enclosed with a modifying agent selected from the group consisting of silanes, boranes and germanes, which may be substituted by one or more halogen atoms and/or hydrocarbon groups, and after the introduction closing the pores by a further treatment with the modifying agent and/or by an oxidation treatment.

As these modifying agents react readily with water, the modification is preferably carried out using a zeolite previously liberated from any water of hydration. This can be achieved in a simple manner by heating, e.g. at a temperature of 300°–400° C., if desired in vacuo. The removal of this water causes the pores to be widened.

When, after the introduction of the material to be encapsulated, an additional quantity of modifying agent is applied, which is then deposited in the pores adjacent to the opening, that opening in narrowed to such an extend that any remaining opening is no longer large enough to permit the passage of the adsorbed molecules or ions.

Instead of an extra treatment with modifying agent, it is also possible to cause the modifying agent already present to increase in volume by an oxidation treament. This, for example, causes the hydrogen atoms of the silane, borane or germane to be replaced by OH groups or oxygen atoms. If sufficient modifying agent is present, in this case, too, the openings of the pores will be narrowed to such an extend that the escape of the adsorbed material by diffusion is no longer possible.

Among the modifying agents which have been found to be effective are monosilane, dimethylsilane, dichlorodimethylsilane, methyltrichlorosilane and diborane. In all these cases, sealing can be suitably carried out by a treatment with an oxidant, such as water vapour of an alkanol, for example, methanol or ethanol.

The treatment of zeolites with monosilane as a modifying agent is known per se from Journal of the Chemical Society, Faraday Transactions, Volume 74, pp 2786-2806. It was found that at low temperature (approx. 77° K.) the modified zeolites described in the article adsorb considerably less nitrogen after silanation than before silanation. The adsorption of oxygen under the same conditions, however, had deteriorated to a much lesser extend from the silanation. The corresponding adsorptions at roomtemperature however, were all neglectable. At 77° K. is was found to be possible to selectively influence the adsorption of $O_2$, $N_2$ and Ar by controled silanation. Analogous effects at roomtemperature or higher are not mentioned in the article.

In Dutch patent application No. 67 157 12, as laid open to public inspection, there is described a method of treating zeolites with a silanating agent whose molecules are so large that they cannot penetrate the pores. As a result, in that method, the outer surface of the zeolite particles is treated only. The intention is that in the selective adsorption of hydrocarbons, little or no material is adsorbed at this outer surface, whereas the adsorption capacity of the pores is not appreciably affected, no more than the rates of adsorption and desorption.

In the treatment with the modifying agents, e.g. monosilane, according to the invention, a reaction occurs between the OH groups present in the zeolite and monosilane, as follows:

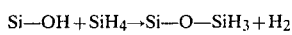

$$Si—OH + SiH_4 \rightarrow Si—O—SiH_3 + H_2$$

and secondary reactions, such as

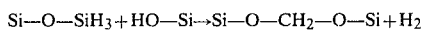

$$Si—O—SiH_3 + HO—Si \rightarrow Si—O—CH_2—O—Si + H_2$$

This treatment with the modifying agents can be controled by controling the quantity of modifying agents added and by changing the number of OH groups in the zeolite used as the starting material.

During the adsorption of the gas, it is not necessary to use high temperatures and pressures, but if desired the process may be conducted at room temperature and atmospheric pressure or reduced pressure. It is only required for the gases to be adsorbed, or the solutions containing the compounds to be adsorbed, or solutions containing the ions to be bound, to be kept in contact with the zeolite for a sufficiently long period of time to approach the condition for equilibrium to the extend desired.

As stated before, after the adsorption of the material to be encapsulated, the pores may be sealed by supplying an additional quantity of modifying agents, or the modifying agent already applied can be oxidized, for example by supplying water vapour. This water vapour will then react with the Si—$H_x$ groups to form Si$(OH)_x$ groups and hydrogen. If desired, this treatment may be repeated several times.

Thereafter the material adsorbed, chemisorbed, or bound by ion exchange can no longer leave the pores so long as the modifying agent is present.

If, at a later time, it is desired for the material to be recovered from the zeolite, this can be done by decomposing the modifying agent, e.g. by heating. When the modifying agent used is $SiH_4$, for example, the openings may be cleared by heating at a temperature of approx. 300° C. or higher. This will first remove any water of hydration, which already leads to the pores being widened, so that in many cases a portion of the encapsulated molecules can escape. Heating at higher temperatures, e.g. upwards of 200° C., will cause the Si—O bonds formed during the silanation to be partly broken, whereby the barrier for the pore openings is removed, and the enclosed material can again issue outwardly by diffusion. In the case of exchanged ions, a suitable solvent is of course required. At a temperature below 300° C., however, the encapsulated material is enclosed in a fully stable manner, and the zeolite containing it can be stored for a long period of time without any particular precaution.

The consequence of the fact that the sealing of the pores can be effected by means of water vapour is that it is not necessary for the zeolite containing the encapsulated material to be protected from contact with water. On the contrary, the absorption of water will lead to the zeolite being hydrated, resulting in the pores becoming still narrower.

The entire process can be carried out at a temperature below 60° C., and particular or expensive apparatus is unnecessary.

Furthermore it is possible to effect a separation of materials during the adsorption, if a portion of the components in a gas mixture consists of molecules too large to penetrate the pores. In that case the smaller molecules are incorporated in the zeolite only. If desired, this separation step may be repeated one or more times before the pores are sealed.

Thus, for example, xenon and carbon dioxide can be separated from each other by incorporating the xenon, but not the carbon dioxide in the zeolite. The only requirement is then that after the treatment with the modifying agent the pores of the zeolite have such a diameter that xenon atoms can, but carbon dioxide molecules cannot enter.

Generally speaking, however, it is not necessary that the treatment with the modifying agent precedes the adsorption of the material to be encapsulated, but these two treatments can also be carried out simultaneously or in reverse order, so that, for example, a mixture of $SiH_4$ and $B_2H_6$ with the gas to be adsorbed is passed into the zeolite.

If it is desired to encapsulate ions in a zeolite, it is possible to start with a zeolite in the H form, and contact it with an aqueous solution containing the ions to be encapsulated. After completion of the ion exchange to the desired extend, the zeolite can be separated from the solution, dried, and silanated, and subsequently the pores can be sealed.

Naturally, these methods can be varied in various ways, depending on the material to be encapsulated.

The invention accordingly provides a method that is valuable for storing toxic or radio active materials in a manner preventing unintentional dispersion in an adequate manner. The invention also provides a method for the stable storage, for later use, of limited quantities, or even minute quantities (e.g. a few picogrammes to a few kilogrammes) of costly materials in a safe manner and in a form that can be properly handled.

The invention also provides a highly suitable method of making "spikes." (A spike is a known number of atoms of a given kind.)

The invention also relates to a zeolite containing trapped molecules or ions inside its pores, characterised in that the major part of its pores is at least partially closed by silicon compounds, boron compounds or germanium compounds, physically bound to the walls of said pores, any remaining openings of these pores being too small to allow the trapped molecules or ions to pass out of the pores.

Such a zeolite material is a new product, which is useful for the storage of the trapped materials over long periods. Providing the number of pores which has not been closed is sufficiently small this zeolite material is suitable for storage of costly, harmful or other materials over long periods of time without any necessity of periodic inspection.

This zeolite material can be obtained by the methods disclosed above and exemplified below.

The invention is illustrated in and by the following examples.

EXAMPLE I

A sample of Na-mordenite was converted by ion exchange with $NH_4Cl$ into $NH_4$ mordenite, which was degassed to form H mordenite.

Subsequently the sample was treated with $SiH_4$ at 120° C. for 24 hours.

The silanated sample was contacted in vacuo at 0° C. with xenon at a gauge pressure of approx. 0.5 atm. whereby xenon was adsorbed in the narrowed pores of the zeolite. This condition was maintained for 24 hours.

Subsequently, while maintaining the xenon pressure and the temperature of 0° C., water was added to the system. Owing to the oxidation reactions which occured, the pores of the zeolite were further narrowed. Also the oxidation reactions proceed slowly at 0° C., it was necessary to maintain this low temperature until the pores had sufficiently narrowed to keep the xenon locked in.

After this treatment, the gaseous phase was pumped away, and the sample was placed under a static vacuum. The temperature was gradually increased, and the released gaseous phase was fractionally collected for mass spectromatric analysis, which gave the following data.

| Temperature, °C. | Released Xe in %[x] | Released $H_2O$ in %[xx] |
|---|---|---|
| 50 | 0.35 | 51 |
| 100 | 0.3 | 15 |
| 160 | 4.5 | 17.5 |
| 220 | 0.55 | 14 |
| 330 | 60.5 | 2.4 |
| 400 | 34.4 | 0.06 |
| 500 | 0.01 | — |

[x]% of adsorbed quantity of Xe [xx]% of adsorbed quantity of $H_2O$

This table shows that, below 100° C., only a very small portion of the adsorbed xenon was released, presumably because it was adsorbed on the outer surface, or because a few pores were not quite closed.

Per kg zeolite 44.8 liters (STP) of xenon could be encapsulated in this way.

EXAMPLE II

The zeolite clinoptilite was used and in the same conditions as in example I krypton was encapsulated.

Examination of the thermal stability of the hydrated system at various temperatures yielded the following results:

| Temperature, °C. | % krypton, released per hour[x] |
|---|---|
| 0 | — |
| 30 | 1.8 |
| 40 | 1.3 |
| 60 | 2.5 |
| 120 | 18.9 |
| 300 | 5.2 |

[x]average quantity released over a long period, expressed in % of the total amount adsorbed.

The above shows that Kr can be completely immobilised at 0° C., but at higher temperatures a very slow escape of the entrapped krypton takes place.

EXAMPLE III

A sample of the zeolite clinoptilolite (Na form) was converted into the $NH_4$ form by ion exchange with an $NH_4Cl$ solution in water. This product was degassed for 24 hours in a vacuum at 360° C. with formation of the H form.

The adsorption capacity for xenon of this product was measured (see the table below).

A fresh similar sample of the H-zeolite was then treated with $SiH_4$ at 120° C. during 24 hours. A part of the freshly silanated sample was contacted with xenon and the adsorption capacity at 0° C. was measured (see the table below). Another part of the freshly silanated sample was further silanated for 24 hours at 120° C. using $SiH_4$, then oxidised using water and the hydration water was removed at 360° C. in a vacuum.

When the adsorption capacity for xenon was again measured this turned out to be 0.3 l xenon (STP) per kg, which corresponds to adsorption on the outer surface and possibly some pores which had not been closed completely.

| Treatment of the sample | Xe adsorbed at 0° C. liters (STP)/kg | Residual pressure, Torr |
|---|---|---|
| not treated | 33.7 | 144 |
| after first silanation | 3.4 | 240 |
| after further silanation | 0.3 | 217 |

The fact that after the silanation only very little xenon could be adsorbed shows that the pores of the zeolite had been sufficiently narrowed to prevent entry of the xenon molecules in the pores. Similarly of course xenon molecules entrapped in the pores could not escape.

Entirely similar results were observed in the adsorption of carbon monoxide and methane.

EXAMPLE IV (a) A sample of H mordenite was modified by silanation as in Example I. This was then used to separate krypton and xenon, which were added in the form of a 50/50 mixture. Because the xenon molecules could not enter the pores the adsorbed gas consisted only of krypton. The results are summarised in the table below, where for comparison also the results are given, obtained with a sample of the same H-mordenite which had not been silanated. The adsorption was performed at 0° C. and 145 Torr (total pressure)

| Treatment of sample | Adsorbed Xe mmol/g zeolite | Adsorbed krypton mmol/g zeolite |
|---|---|---|
| not treated | 1.65 | 0.5 |
| treated | 0.01 | 0.51 |

(b) An analogous experiment was performed using a 51/49 mixture of $CO_2$ and xenon.

Since here again the xenon molecules could not enter the pores of the silanated H-mordenite a complete separation of the two gases was obtained. The adsorption conditions were the same as in Example IV, part (a).

| Treatment | Adsorbed Xe mmol/g | Adsorbed $CO_2$ mmol/g |
|---|---|---|
| not treated | 1.5 | 2.55 |

-continued

| Treatment | Adsorbed Xe mmol/g | Adsorbed $CO_2$ mmol/g |
|---|---|---|
| silanated | 0 | 1.74 |

EXAMPLE V

At 0° C. and at 200 torr xenon was adsorbed on a sample of H-mordenite. After the adsorption and still in the presence of the unadsorbed xenon diborane ($B_2H_4$) was added and the resulting gas mixture was left in contact with the zeolite at 0° C. The remaining gas was then pumped out.

The sample so obtained was again contacted with xenon at 0° C. and a pressure of 300 mm Hg. Then water was added to the system in the form of a saturated vapour, still in the presence of the xenon.

This oxidation with water vapour was first carried out at 0° C. and then at 50° C.

After the oxidation the sample was kept under a vacuum at 50° C. for one hour with continuous pumping.

The stability of the system so obtained was tested by keeping the sample in a static vacuum and collecting all released gases at each temperature fractionally and analysing them by mass spectrometry.

The results are as follows:

| Temperature of sample, °C. | Xenon released, % of total quantity adsorbed | |
|---|---|---|
| 0 | 0.0 | |
| 25 | 0.10 | additional |
| 50 | 0.10 | immobilisation by |
| 100 | 0.90 | water of hydration |
| 150 | 2.78 | |
| 200 | 3.03 | |
| 250 | 10.29 | |
| 250 | 41.36 | immobilisation by |
| 300 | 33.34 | boranation only |
| 350 | 8.04 | |
| 450 | — | |

EXAMPLE VI

Encapsulation of krypton by boranation.

Krypton was added on H-mordenite LP at 0° C. and 360 mm Hg. Then $B_2H_4$ was added, keeping the partial pressure of Kr constant. After the chemisorption of the diborane at 0° C. water vapour was added to the system. After the oxidation a second portion of diborane was added and after chemisorption a second dose of water vapour. During these steps the sample remained in contact with the krypton gas at 0° C.

Then the gas phase was removed by evacuation. The stability of the system so obtained was tested at various temperatures by keeping the sample in a vacuum and collecting all released gases in fractions and analysing them by mass spectrometry.

The results are given below:

| Temperature of the sample, °C. | Krypton released % of the total amount adsorbed | |
|---|---|---|
| 0 | 0.30 | additional |
| 50 | 1.45 | stabilisation |
| 100 | 14.66 | by |
| 150 | 25.07 | hydration |
| 200 | 44.40 | |
| 250 | 12.34 | immobilisation |
| 300 | 1.20 | by boranation |
| 350 | 0.85 | only |
| 400 | 0.08 | |

EXAMPLE VII

Encapsulation of krypton in mordenite LP by silanation.

H-mordenite LP was treated with $SiH_4$ at 0° C. and then at 120° C. as in the earlier examples.

The silanated sample was then contacted with krypton at 0° C. and an absolute pressure of 0.5 atm. After the adsorption, and maintaining the equilibrium pressure of krypton all the time and at 0° C., water was added to oxidise the adsorbed silane with narrowing of the pores. After oxidation for 60 hours the remaining gases were pumped out and the sample was kept under a static vacuum. The stability of the system was checked by gradually raising the temperature of the sample, collecting the released gases fractionally and analysing them by mass spectrometry.

The results are given below:

| Temperature of sample °C. | Krypton released % ot total adsorbed amount | |
|---|---|---|
| 0 | 0.20 | additional |
| 25 | 0.20 | stabilisation |
| 50 | 4.40 | by water of |
| 120 | 28.78 | hydration |
| 200 | 61.59 | immobilisation |
| 250 | 4.52 | only by |
| 360 | 0.29 | boranation |

EXAMPLE VIII

Encapsulation of krypton with modification by monosilane and dichloro dimethyl silane.

A sample of H-mordenite LP was dehydrated, then silanated and after that oxidised with water at 150° C., followed by dehydrating it again at 350° C. in a vacuum.

This sample was used to adsorb krypton at 0° C. to an equilibrium pressure of 380 cm Hg. At this same krypton pressure the sample was then hydrated with saturated water vapour.

After the oxidation the remaining gases were pumped out and the sample was contacted with dichloro dimethyl silane at 0° C. at the vapour pressure of the silane compound.

After this reaction the reaction products and the krypton released during this period were removed by condensing them at −196° C. while the sample itself was kept at 0° C.

The stability of the product was then tested in a static vacuum at various temperatures by collecting all released gases fractionally and analysing them by mass spectrometry.

The results are given below:

| Temperature of sample °C. | Amount of krypton released % of total amount adsorbed |
|---|---|
| 0 | 0.06 |
| 25 | 0.25 |
| 80 | 14.16 |
| 160 | 83.72 |
| 230 | 1.60 |

-continued

| Temperature of sample °C. | Amount of krypton released % of total amount adsorbed |
|---|---|
| 300 | 0.11 |
| 360 | 0.04 |

EXAMPLE IX

Encapsulation of krypton in clinoptilolite

A sample of H-clinoptilolite was treated with monosilane at a temperature first at 20° C. and later at 120° C. Then the sample was oxidised with water vapour at 200° C. and again dehydrated at 360° C. in a vacuum.

Then krypton was adsorbed at 0° C. and a pressure of 500 mm Hg.

The sample was then rehydrated at 0° C. in the presence of the krypton which had not been adsorbed. This rehydration narrowed the pores, which had already been narrowed by the treatment with the monosilane, making it difficult for the krypton to escape from the pores.

After this rehydration the remaining gases were pumped out and immediately replaced by dichloro dimethyl silane vapour. After this had been adsorbed and had reacted with the water of hydration in the sample a second and then a third dose of dichloro dimethyl silane were added and reacted. This procedure had for its result that the pores of the zeolite were closed to krypton.

The stability of the product was tested by keeping the sample in a static vacuum, fractionally collecting all the released gases and analysing them by mass spectrometry.

The released quantity of krypton was determined as a function of the sample temperature.

| Sample temperature °C. | Released amount of krypton % of total amount adsorbed | |
|---|---|---|
| 0 | <0.05 | additional |
| 25 | <0.05 | immobilisation |
| 75 | 1.35 | by water of |
| 133 | 37.38 | hydration |
| 220 | 54.31 | immobilisation |
| 330 | 6.81 | by silanes |
| 440 | 0.15 | only |

EXAMPLE X

Encapsulation of benzene vapour in mordenite using dichloro dimethyl silane.

A sample of H-mordenite LP was dehydrated at 360° C. and benzene vapour was adsorbed on it at 0° C. at the vapour pressure of benzene. The sample was then rehydrated by adding water to the system while still in the presence of benzene vapours. After the rehydration the remaining vapours were pumped out and the sample was contacted with saturated vapour of dichloro dimethyl silane and saturated vapour of benzene, first at 0° C. and later at room temperature (about 23° C.). After this reaction the remaining vapours were removed by condensing them in a cold trap (−196° C.).

The stability of the system was tested in the same way as used in other examples.

The results are given below:

| Temperature of sample °C. | Amount of benzene released % of total amount adsorbed |
|---|---|
| 0 | 0.0 |
| 25 | 0.0 |
| 90 | 5.1 |
| 160 | 10.0 |
| 230 | 18.9 |
| 300 | 16.9 |
| 360 | 22.9 |
| 400 | 0.3 |

EXAMPLE XI

Encapsulation of benzene in mordenite using monosilane.

A sample of H-mordenite LP was dehydrated at 360° C. and then contacted with saturated benzene vapours at 0° C. to adsorb benzene in the pores.

Then monosilane was added in the presence of saturated benzene vapours, first at 0° C. and later the temperature was raised to room temperature (about 23° C.).

After the remaining vapours had been removed the adsorbed silane was oxidised with water vapour in the presence of saturated benzene vapours, first at 0° C. and later at room temperature (23° C.).

After this reaction the benzene and water were removed using a cold trap (−196° C.).

The stability of the system was tested in the usual way.

The released benzene was collected in cyclohexane at −196° C.

The results are given below.

| Temperature of sample °C. | Amount of benzene released % of total amount adsorbed |
|---|---|
| 0 | 0.0 |
| 25 | 0.0 |
| 90 | 0.0 |
| 160 | 24.6 |
| 230 | 24.4 |
| 300 | 15.5 |
| 360 | 19.7 |

EXAMPLE XII (a) Modification of the rates of adsorption and desorption by modification of zeolites.

The rate of adsorption of silanes or boranes in the pores of a zeolite such as mordenite can be changed by narrowing of these pores. At the same time the rate of desorption is also changed.

In this example three samples of mordenite (A to C) were silanated using different amounts of monosilane for each sample.

Of these three samples and of a control sample (P) the amount of adsorbed krypton was determined as a function of time and plotted as a function of $\sqrt{t}$ where t is expressed in minutes.

The amount of adsorbed krypton is expressed as $Q_t/Q_\infty$ where $Q_t$ is the amount adsorbed at time t and $Q_\infty$ is this amount at equilibrium.

The results are shown in the table below.

The amounts of silane used in each sample were:

| P | none |
| A | 0.6 mmol SiH$_4$/g dry zeolite |

|   | B | 1.0 mmol SiH$_4$/g dry zeolite | | |
|---|---|---|---|---|
|   | C | 1.4 mmol SiH$_4$/g dry zeolite | | |
|   |   | Kr ($Q_t/Q_\infty$) | | |
| t (min$^{\frac{1}{2}}$) | P | A | B | C |
| 2 | 0.87 | 0.61 | 0.026 | — |
| 3 | 0.95 | 0.80 | 0.029 | — |
| 4 | 0.99 | 0.89 | 0.037 | — |
| 5 | 0.99 | 0.95 | 0.041 | — |
| 6 | 1.0 | 0.96 | 0.045 | — |
| 7 | — | 0.97 | 0.051 | — |
| 8 | — | 0.98 | 0.056 | — |
| 10 | — | 0.99 | 0.066 | 0.010 |
| 12 | — | 1.0 | 0.079 | — |
| 15 | — | — | 0.099 | — |
| 20 | — | — | 0.138 | 0.021 |
| 30 | — | — | 0.206 | 0.032 |
| 40 | — | — | 0.280 | 0.045 |
| 70 | — | — | — | 0.077 |
| 90 | — | — | — | 0.106 |

(b) In this example similar experiments were performed, but diborane was used to modify the zeolite.

One control sample (P) of H-zeolite LP was used and two other samples (A and B) of the same zeolite and the rate of adsorption of argon was determined.

The results are shown below:

|   | Ar($Q_t/Q_\infty$) | | |
|---|---|---|---|
| t (min$^{\frac{1}{2}}$) | P | A | B |
| 2 | 0.97 | 0.34 | 0.028 |
| 3 | 0.99 | 0.47 | 0.032 |
| 4 | 1.0 | 0.54 | 0.05 |
| 5 | 1.0 | 0.57 | — |
| 6 | — | 0.64 | — |
| 8 | — | 0.67 | — |
| 10 | — | — | 0.109 |
| 15.5 | — | — | 0.15 |
| 17 | — | — | 0.18 |
| 20 | — | — | 0.21 |

These experiments clearly show that the pore diameters of the zeolites can be changed in such a way that a practically useful rate of adsorption can be obtained for each material to be encapsulated according to the invention.

EXAMPLE XIII

Closing of zeolite pores by silanation.

(a) Closing of pores to xenon.

A sample of Na-clinoptilolite was converted to NH$_4$-clinoptilolite by ion exchange with an NH$_4$Cl solution and this material was then degassed in a vacuum at 360° C. Thereby an H-clinoptilolite was obtained. At 0° C. and adsorption capacity for xenon was determined and the xenon was removed again.

Then the sample was treated at 120° C. with SiH$_4$ for 24 hours and the adsorption capacity of the treated product was again determined. After removal of the adsorbed xenon and sample was further silanated with SiH$_4$ at 120° C. for 24 hours, then oxidised with water vapour and again dehydrated at 360° C. in a vacuum.

The various adsorption capacities were:

| Treatment | xenon adsorbed at 0° C. liters (STP)/kg zeolite | residual pressure Torr |
|---|---|---|
| none | 33.7 | 144 |
| first silanation | 3.4 | 240 |
| 2nd silanation and oxidation | 0.3 | 217 |

The results show that already after the first silanation the pores were narrowed considerably but a number of them were still open to xenon molecules.

After the oxidation and second silanation the pores were practically all closed to xenon and adsorption could only take place on the outer surface of the zeolite particles.

Analogous results were obtained for the adsorption of CO and CH$_4$.

(b) Closing of pores to krypton.

A sample of H-mordenite LP was dehydrated at 360° C. and the adsorption capacity for krypton was determined.

After removing the krypton the sample was treated with diborane at 0° C. for 24 hours and then oxidised with water vapour. Then the sample was dehydrated at 400° C. and the adsorption capacity was again determined. No adsorption could be observed after 24 hours of contact at 0° C.

| Sample | Kr adsorbed at 0° C. liter (STP)/kg zeolite | Residual pressure Torr |
|---|---|---|
| not treated | 16.6 | 330 |
| treated | 0 | 330 |

This absence of adsorptive capacity was not caused by destruction of the zeolite structure but only by the pores being narrowed. This is shown by the fact that the treated sample still had the ability to adsorb molecules with a smaller diameter than krypton.

EXAMPLE XIV

Encapsulation of toluene in mordenite, using dichloro dimethyl silane.

A sample of NH$_4$-mordenite was heated at 360° C. overnight to remove water of hydration and ammonia with formation of dehydrated H-mordenite. On this sample toluene vapour at its own vapour pressure was adsorbed at 0° C. Then water was added in the presence of the toluene vapour to rehydrate the zeolite.

After equilibration and remaining vapours were pumped out and the sample was contacted with saturated vapour of dichloro dimethyl silane in the presence of saturated toluene vapour first at 0° C. and later at room temperature (about 25° C.).

After this reaction all residual gases and vapours were removed by using a cold trap (−196° C.).

The stability of the system obtained was tested at various temperatures in a static vacuum. The released toluene was fractionally collected in collectors containing cyclohexane at −196° C. The toluene concentrations were determined by UV analysis. The results are tabulated below.

| Temperature of sample °C. | Amount of toluene released % of total amount adsorbed |
|---|---|
| 0 | 0.0 |
| 25 | 0.0 |
| 90 | 0.0 |

-continued

| Temperature of sample °C. | Amount of toluene released % of total amount adsorbed |
|---|---|
| 160 | 46.5 |
| 230 | 38.2 |
| 300 | 15.5 |

EXAMPLE XV

Encapsulation of benzene in mordenite using trichloro methyl silane.

A sample of H-mordenite was prepared as in example XIV.

It was then contacted with saturated benzene vapour at 0° C. After the adsorption water was added to rehydrate the zeolite with saturated water vapour at 0° C.

After this equilibration the rehydrated sample was contacted with saturated vapour of benzene and saturated vapour of trichloro methyl silane, first at 0° C. and later at room temperature (about 22° C.).

After this reaction period all residual gases and vapours were removed. The stability of the product was tested in a static vacuum, while the temperature was raised stepwise. The released benzene vapour was fractionally collected in cyclohexane, cooled at −196° C. The benzene concentrations were determined by UV analysis. The results are tabulated below.

| Temperature of sample °C. | Amount of benzene released % of total amount adsorbed |
|---|---|
| 0 | 0 |
| 25 | 0 |
| 90 | 1.6 |
| 160 | 34.4 |
| 230 | 39.8 |
| 300 | 14.6 |
| 360 | 9.9 |

EXAMPLE XVI

Encapsulation of ions in zeolite Y using a silicone polymer.

A sample of Na-zeolite Y was converted into Ca-zeolite Y at room temperature using conventional techniques and a 0.1 N solution of $CaCl_2$.

The Ca-zeolite was then washed with distilled water until no more chloride ions could be found and dried at room temperature. The sample Ca-zeolite was treated at room temperature with a silicone polymer (obtained by hydrolysis of dichloro dimethyl silane followed by co-condensation). Both the Ca-zeolite treated and the untreated Ca-zeolite were tested for release of Ca-ions by an ion exchange procedure in aqueous solution at various temperatures. The results are shown below.

| Sample | Temperature °C. | Duration of treatment hrs | $Ca^{++}$ released mcg/g zeolite | % of total Ca |
|---|---|---|---|---|
| not treated | 25 | 3 | 3.34 | 100 |
| treated | 25 | 23 | 0 | 0 |
|  | 25 | 45 | 0 | 0 |
|  | 25 | 119 | 0 | 0 |
|  | 25 | 288 | 0 | 0 |
|  | 60 | 28 | 0.15 | 4.5 |
|  | 60 | 51 | 0.54 | 16.4 |

-continued

| Sample | Temperature °C. | Duration of treatment hrs | $Ca^{++}$ released mcg/g zeolite | % of total Ca |
|---|---|---|---|---|
|  | 60 | 119 | 3.34 | 100 |

EXAMPLE XVII

Zeolites with a desired pore diameter for selective adsorption or separation of gas mixtures.

A stock of H-mordenite was obtained from $NH_4$-mordenite LP by heating at 360° C. overnight.

Samples of this stock were treated with diborane at 0° C., 20° C. and 40° C. during varying periods. Depending on the temperature and the duration of the treatment varying amounts of diborane were deposited in the pores.

The amount of diborane deposited in each sample was determined by analysis.

As a result of this deposition and of the oxidation process the pore diameter of the mordenite was changed with a corresponding change in the adsorption capacities for various gases, especially xenon, nitrogen, krypton, oxygen and hydrogen.

The untreated stock had the following adsorption capacities:

| Gas | Capacity mmoles/g | Temperature °C. | Pressure Torr |
|---|---|---|---|
| Xe | 1.7 | 0 | 260 |
| $N_2$ | 4.96 | −196 | 67 |
| Kr | 0.7 | 0 | 322 |
| $O_2$ | 5.3 | −196 | 104 |
| $H_2$ | 3.5 | −196 | 250 |

For the boranated samples the adsorption capacities were determined in the same conditions. The results are listed below as the percentages of decrease in adsorption capacity as a function of the amount of diborane deposited in the samples.

| Sample | Amount of $B_2H_4$ mmol/g zeolite | Xe | $N_2$ | Kr | $O_2$ | $H_2$ |
|---|---|---|---|---|---|---|
| A | 0.16 | 10 | 11 | 10 | — | — |
| B | 0.32 | 21 | 16 | 21 | — | — |
| C | 0.80 | 66 | 60 | 46 | — | — |
| D | 0.90 | 85 | 72 | 50 | — | — |
| E | 0.92 | 100 | 93 | 54 | — | — |
| F | 0.94 | 100 | 100 | 58 | — | — |
| G | 1.01 | 100 | 100 | 63 | 0 | 0 |

Sample G was then oxidised, using methanol vapours and the decrease in adsorption capacities was determined again, relative to the untreated stock. The capacities of the oxidised sample were also determined after heating at 250° C., 300° C. and 350° C. respectively.

The results were as follows:

| not heated | 100 | 100 | 100 | 98 | 100 |
|---|---|---|---|---|---|
| 250° C. | 100 | 100 | 100 | 95 | <48 |
| 300° C. | 100 | 100 | 100 | 90 | <43 |
| 350° C. | 100 | 100 | 100 | 80 | <30 |

These data show that by the boranation alone the pores were gradually closed to Xe, $N_2$ and Kr but not to $O_2$ and $H_2$. On oxidation with methanol vapours the pores were closed to all these gases, but on heating (with elimination of loosely bound methanol and some decomposition of chemically bound methoxy groups) a part of the pores were opened again to hydrogen and oxygen but not to Xe, $N_2$ and Kr.

These and similar effects could obviously be used to separate gases and to encapsulate or release only certain components.

EXAMPLE XVIII

Encapsulation of krypton in mordenite using monosilane.

A sample of H-mordenite was treated with $SiH_4$ at 0° C. and later at 120° C. The silanated sample was contacted with krypton at 0° C. and 0.5 ata. After equilibration the partial pressure of Kr and the temperature were maintained and water was added to oxidise the $SiH_4$. The sample was then recovered and contacted with air and then embedded in a silicone polymer.

The stability of the mixture so obtained was determined in the usual way by heating the sample stepwise, fractionally collecting the gas released and analysing it by mass spectrometry.

The results are given below:

| Temperature of sample °C. | Amount of Kr released % of amount adsorbed | |
|---|---|---|
| 25 | 0.19 | additional immobilisation by water of hydration |
| 50 | 0.24 | |
| 100 | 2.54 | |
| 150 | 41.84 | immobilisation by silanation and embedding alone |
| 200 | 48.91 | |
| 250 | 0.49 | |
| 300 | 0.65 | |
| 350 | 3.05 | |

We claim:

1. A method of reducing the pore size of zeolites comprising treating a zeolite with a modifying agent to penetrate, be adsorbed in said pores and reduce the pore size in a controlled manner, said modifying agent being selected from the group consisting of silanes, halosilanes, alkylsilanes, boranes, haloboranes and alkylboranes, germanes, halogermanes and alkylgermanes.

2. The method of claim 1 wherein said modifying agent is selected from the group consisting of silane, dimethylsilane, dichlorodimethylsilane, methyl trichlorosilane and diborane.

3. A method of separating mixtures, which comprises contacting pore-containing zeolites with a mixture of components, selectively adsorbing at least one component of the mixture in the pores of the zeolite, separating the zeolite from the non-adsorbed component and desorbing the absorbed substances, said zeolite having been treated with a modifying agent selected from the group consisting of silanes, halosilanes, alkylsilanes, boranes, haloboranes and alkylboranes, germanes, halogermanes and alkylgermanes to reduce the pore size to a desired dimension.

4. A zeolite containing trapped material in the form of molecules or ions inside its pores, a major part of said pores being partially closed by a modifying agent selected from the group consisting of silanes, halosilanes, alkylsilanes, boranes, haloboranes and alkylboranes, germanes, halogermanes and alkylgermanes which are bound chemically or physically to the walls of the pores, the openings of said pores being too small to allow trapped materials from passing out of the pores.

* * * * *